(12) United States Patent
Paice

(10) Patent No.: US 6,191,968 B1
(45) Date of Patent: Feb. 20, 2001

(54) WYE CONNECTED 3-PHASE TO 9-PHASE AUTO-TRANSFORMER WITH REDUCED WINDING CURRENTS

(76) Inventor: Derek A Paice, 114 Rosewood Ct., Palm Harbor, FL (US) 34685

( * ) Notice: Under 35 U.S.C. 154(b), the term of this patent shall be extended for 0 days.

(21) Appl. No.: 09/533,510

(22) Filed: Mar. 23, 2000

(51) Int. Cl.[7] .................................................. H02M 5/00
(52) U.S. Cl. .............................................................. 363/148
(58) Field of Search ..................................... 363/148, 149, 363/152, 153

(56) References Cited

U.S. PATENT DOCUMENTS 4,779,181 * 10/1988 Traver et al. ......................... 363/154
5,053,689 * 10/1991 Woodson et al. ..................... 318/705

* cited by examiner

Primary Examiner—Adolf Deneke Berhane

(57) ABSTRACT

In an 18-pulse converter system a 3-phase to 9-phase auto transformer with multiple windings per phase is used to power a 9-phase AC to DC converter. The transformer kVA rating is typically about 55% of the DC load kW. Multiple delta connected coils formed around a basic wye connected structure provide a means to circulate the third harmonics of current necessary for proper operation and reduce the amplitude of load current flowing in individual stub windings. The similar current rating required in several of the multiple coils, coupled with reduced amplitude compared to other topologies, facilitates manufacturing of higher power transformers without the need to parallel conductors. The voltage ratio can be selected so as to give an average dc output from an 18-pulse converter which is generally the same as that of a conventional 3-phase bridge rectifier without transformer, however, the topology described is also suitable for step up or step down of voltage as required. Where necessary to further reduce high frequency harmonic currents, a 3-phase ac line reactor may be connected in series with the source of ac power.

4 Claims, 4 Drawing Sheets

US 6,191,968 B1

WYE CONNECTED 3-PHASE TO 9-PHASE AUTO-TRANSFORMER WITH REDUCED WINDING CURRENTS

BACKGROUND OF THE INVENTION

To meet industry needs for electrical power converters which convert AC to DC without injecting large amounts of harmonic currents into the power system, several transformer and converter topologies are available. All require installation of extra equipment and add to the total cost. Preferred methods are those which perform well in practical power systems which incorporate voltage unbalance and preexisting harmonic voltages. Examples of these methods are given by Rosa, Meir, and McMurray. Also powerful techniques in which the 3-phase power is first converted to 9-phase power before processing have been described in the literature of U.S. Pat. Nos. 5,124,904, 5,455,759, and 5,619,407. Equipments using these three patents are in use. However, continual improvements are sought to reduce cost and increase the power rating capability. This invention describes another 3-phase to 9-phase transformer method which reduces cost, and increases feasible power capability of a low voltage auto-connected transformer.

BRIEF SUMMARY OF THE INVENTION

A 3-phase to 9-phase auto-transformer with the main windings configured in a wye manner is arranged to provide nine output voltages which are of generally equal amplitude with a phase displacement of generally 40°. Such voltages applied to a 9-phase bridge rectifier arrangement result in low harmonic currents being drawn from the 3-phase AC power source. Thus the rectifier equipment is much better able to conform to specifications such as IEEE 519 which restrict the amount of harmonic current which may be injected into an electrical power system. In its preferred form for 18-pulse operation a single transformer with 7 coils per phase provides nine output voltages of an amplitude such that the converter DC output voltage is generally the same as would be obtained with a 3-phase rectifier bridge connected directly to the 3-phase power source. By this means lower harmonic currents are feasible without affecting the basic design of existing conversion equipments. However, if required, higher or lower voltages can be achieved with suitable tappings on the transformer windings in a manner well known to those familiar with transformer design. The preferred embodiment for 18-pulse operation is shown in FIG. 3. It includes a basic wye structure auto-transformer such as that taught in U.S. Pat. No. 5,455,759, but includes additional coils connected between terminals 2 and 9 to P1, terminals 3 and 5 to P2, and terminals 6 and 8 to P3. These additional paths reduce the high current pulses which normally flow in the output coils, such as N4C and N5B in phase A, N4A and N5C in phase B, and N4B and N5A, in phase C. They also provide a path for third harmonic currents such that a tertiary winding is not required. Further they allow some flexibility to select coils in a manner favorable to balancing leakage inductance and commutation effects.

DESCRIPTION OF THE INVENTION

Figure 1:
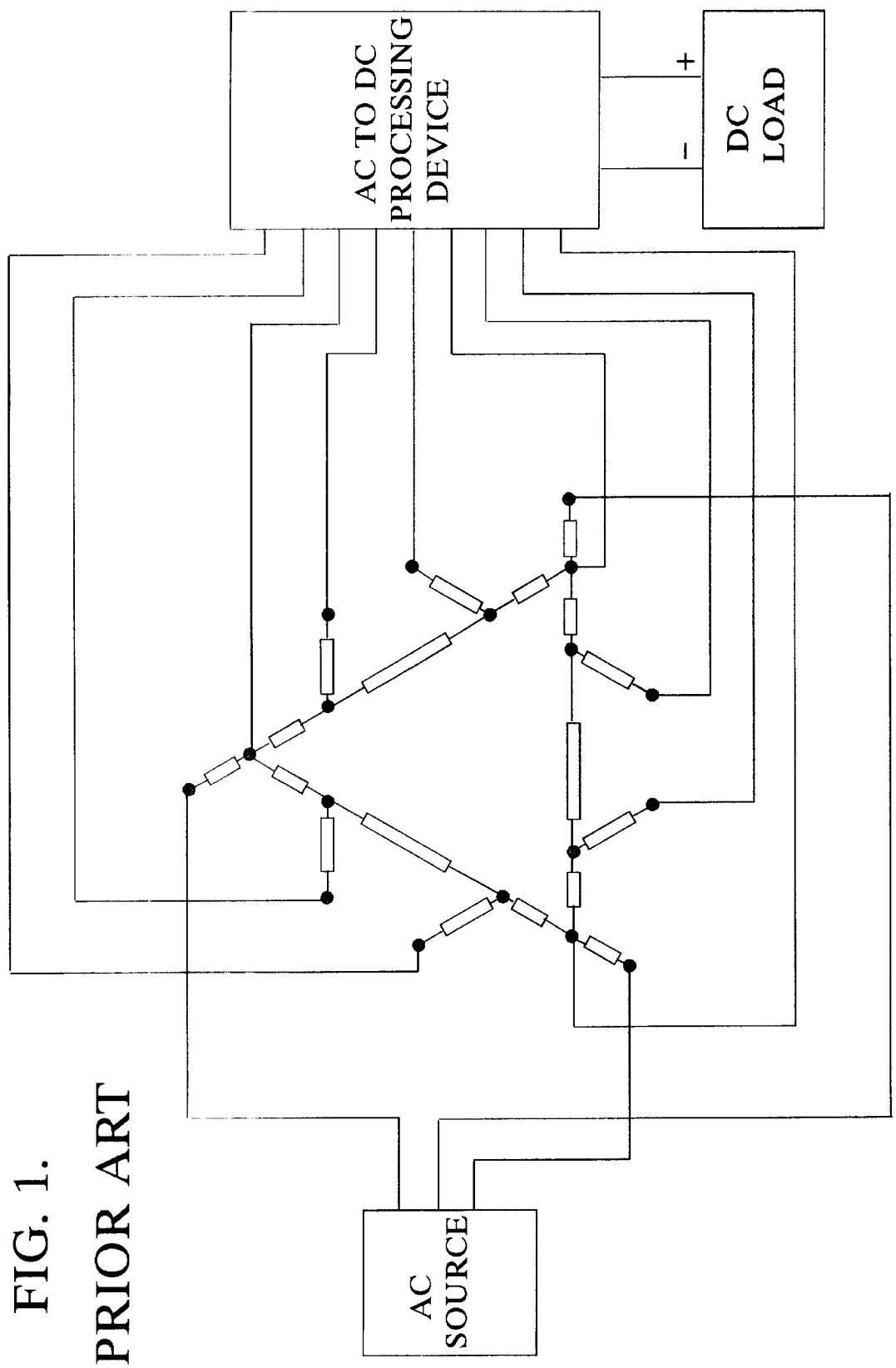
FIG. 1 shows the prior art of U.S. Pat. No. 5,124,904 in which a 3-phase to 9-phase auto-transformer with basic delta connections uses stub windings from the delta to provide additional outputs of appropriate amplitude and phase. Where necessary a small 3-phase impedance can be connected in series with certain connections to ensure that transformer leakage reactance effects are balanced.
Figure 2:
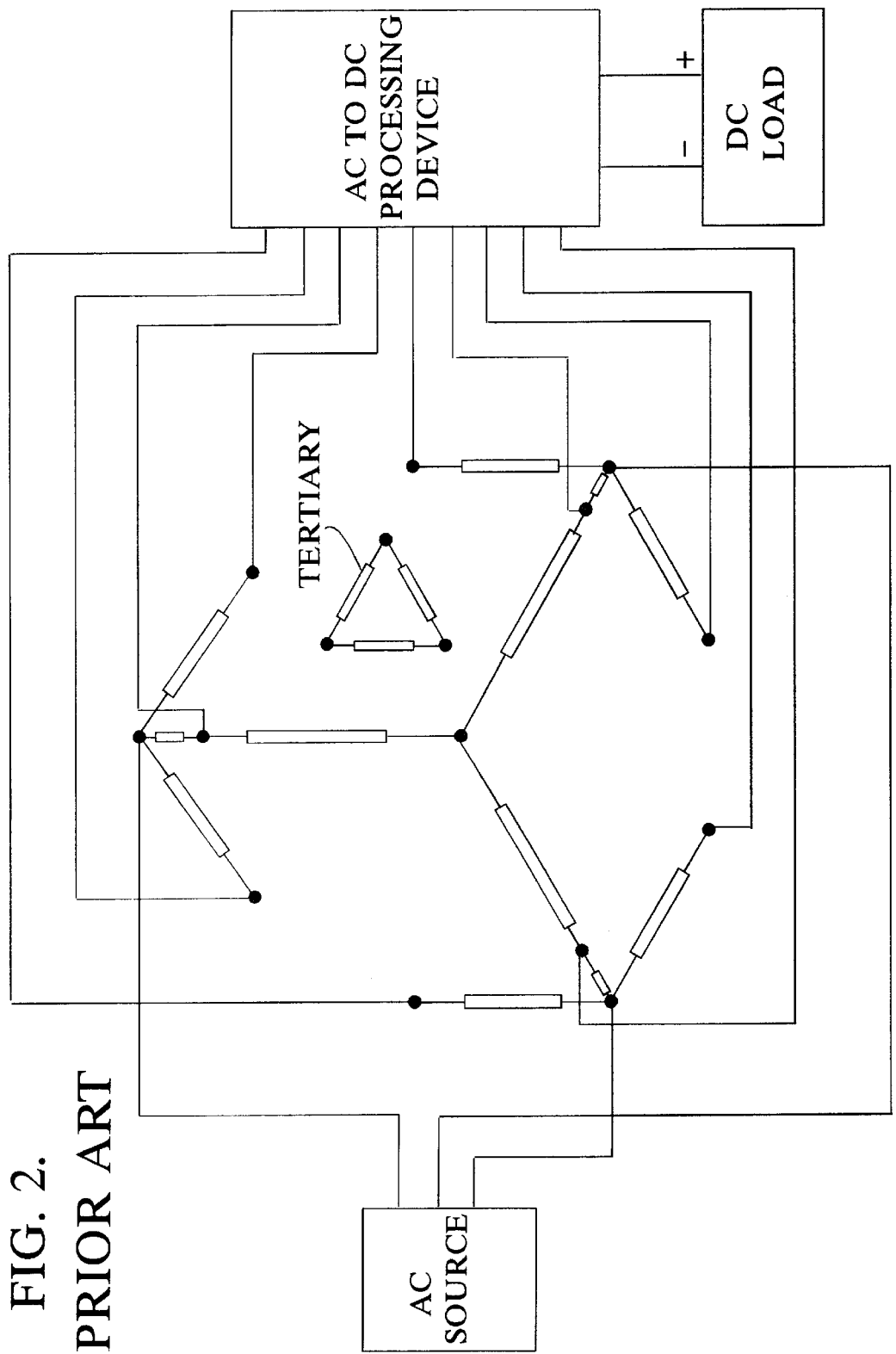
FIG. 2. shows the prior art of Patent No. 5,455,759 in which a 3-phase to 9-phase auto-transformer with basic wye connections uses stub (ZIG) windings from the wye connections to provide additional outputs of appropriate amplitude and phase. In this design a small tertiary winding provides a path for third harmonics of current to flow. Where necessary a small single-phase impedance can be connected in series with the tertiary winding to balance the commutating effects of transformer leakage reactance.
Figure 3:
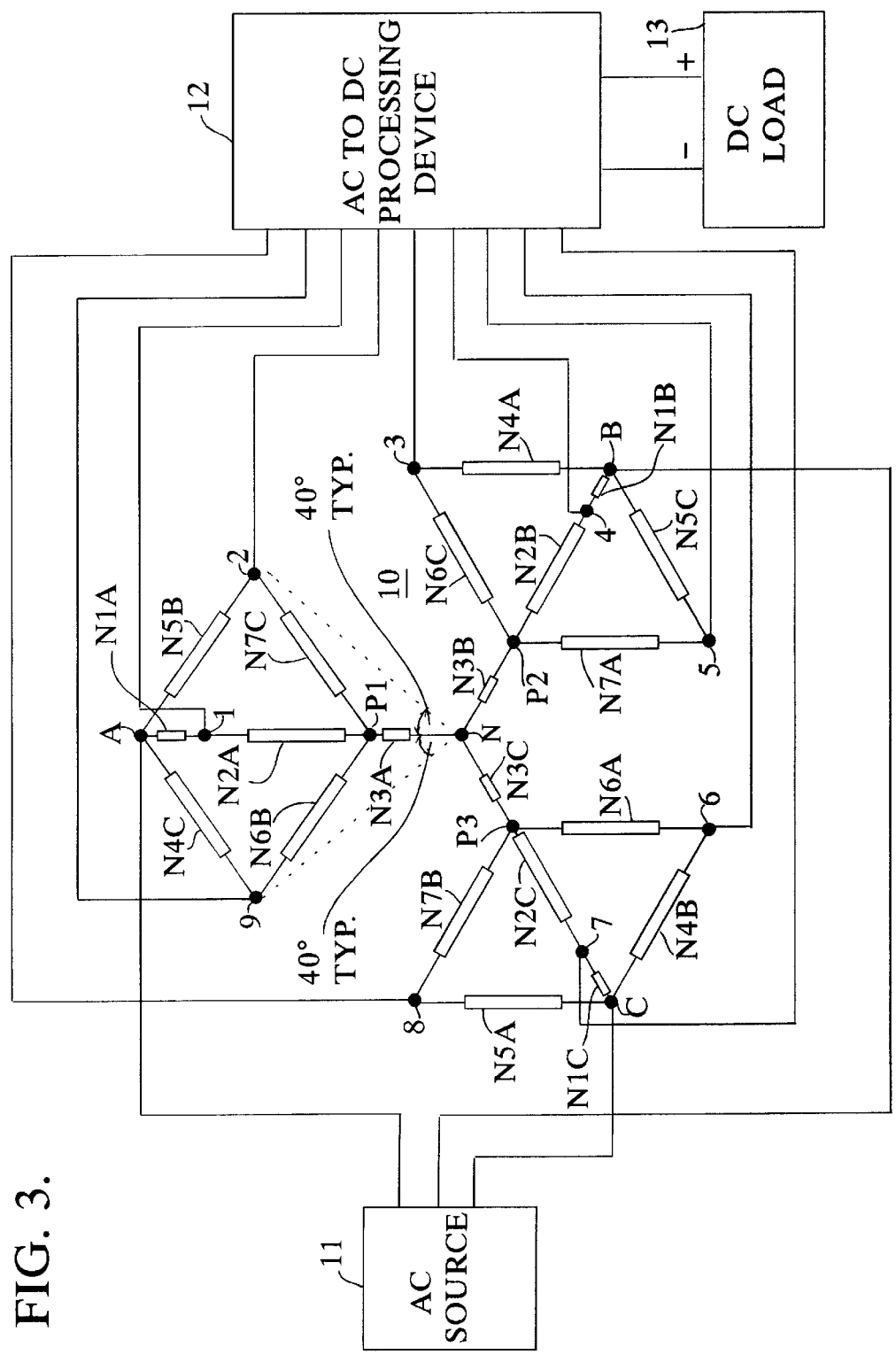
FIG. 3. shows the auto-transformer invention 10 described in this patent. Stub windings from one phase connect to corresponding stub windings from another phase, and to the same number of turns on the basic wye structure. By this means delta paths are provided for the third harmonics of current. Also the substantial current pulses drawn from the stub windings in U.S. Pat. No. 5,124,904 and 5,455,759 are reduced by a factor of about 1.8 times. Not only is the stub current reduced by a factor of 1.8 times, but each stub winding carries nearly the same amount of current. Thus it may be economic for stub coils to use the same conductor size. This is an important practical advantage. Also the availability of equal rating windings provides additional flexibility to select connections which result in better inherent balance of the leakage inductance.
Figure 4:
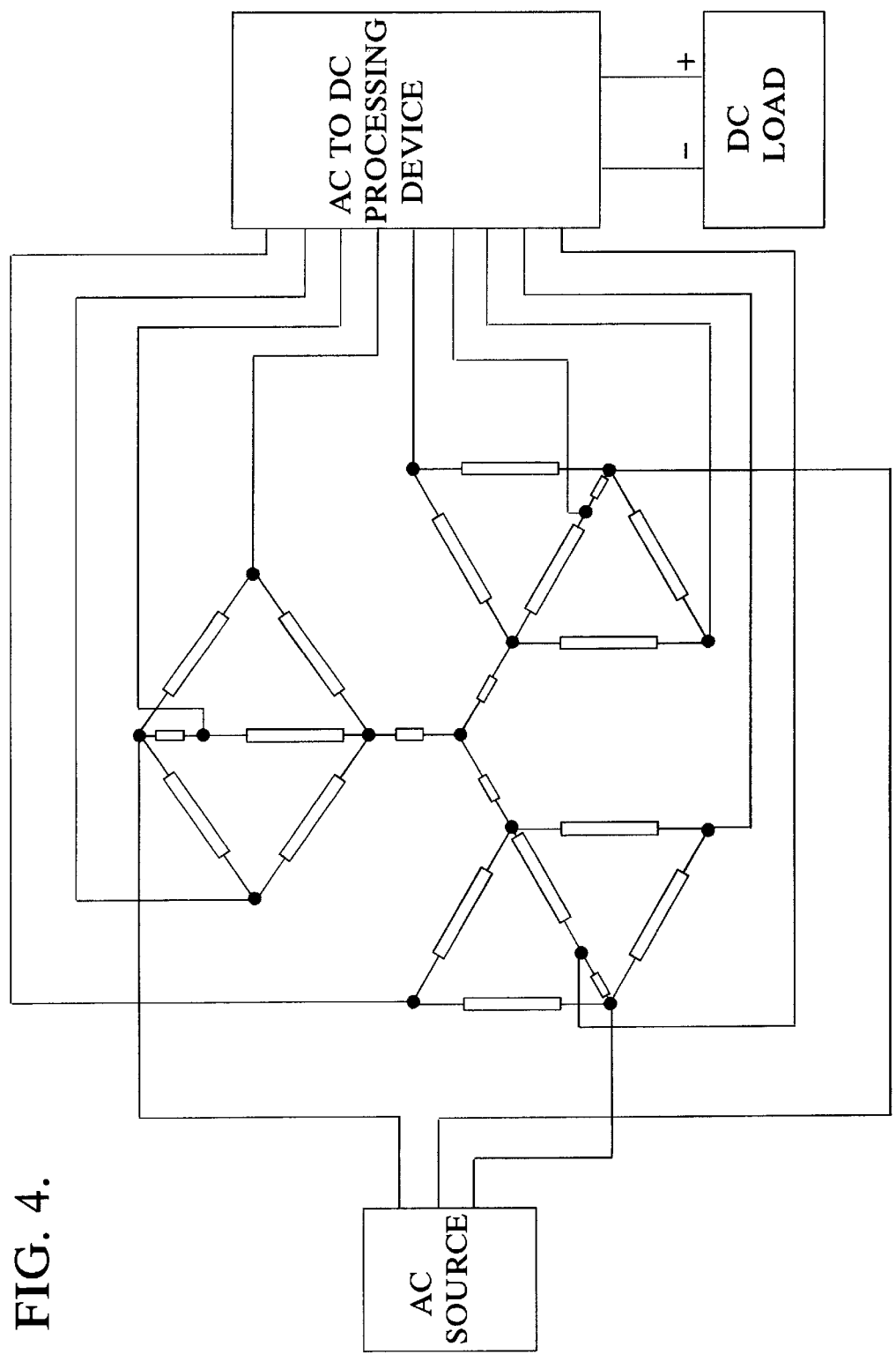
FIG. 4. shows a basic schematic connection of the auto-transformer invention with the winding reference numbers omitted for clarity.

FIG. 3 gives a schematic representation of the invention in which transformer coils are represented by rectangles. For example, coils associated with phase A are labelled N1A through N7A. The N1 to N7 label in the description provides a way to indicate the number of turns on each coil, as shown in table 1. Other phases have appropriate labels, for example the coil labelled N2B has N2 turns on phase B, the coil N4C has N4 turns on phase C, and so on. In practice, there is not a rigorous distinction between the terms "coil" and "winding" and the terms may be used synonymously in this discussion. Points of connection to the various coils are indicated by a circular dot The junction of coils N3A, N3B, and N3C constitute a neutral point N. Voltages from the AC source 11, are supported by the turns such as (N1A +N2A +N3A) for phase A and so on. The 3-phase auto-transformer consists of coils wound over a magnetic structure having at least three limbs, one for each phase. The most prevalent magnetic structure is commonly referred to as a 3-limb core assembly, but the design can use other magnetic structures as described in classic transformer books and literature. Also it is feasible to construct the transformer using three separate single-phase structures, should this be desired.

A 3-phase power source 11 with generally equal voltage amplitudes and phase displacement of 120° is connected to terminals A, B, and C representing the three-phases A, B, and C of the invention. The 9-phase output terminals are designated as points 1 through 9 and are fed to an AC to DC output processing device 12 such as a 9-phase bridge rectifier. Output from 12 is fed to a DC load 13 such as an adjustable frequency motor drive inverter.

To avoid unwanted circulating currents at fundamental frequency, the turns N4, N5, N6, and N7 are all equal to turns (N1+N2). Since turns have to be integer values these important relationships are readily obtained in practice. The volts per turn in a given transformer design are fixed and thus voltage across any coil simply varies as its turns. For example, if the voltage from A to N is $V_{A-N}$ and the voltage from 1 to N is $V_{1-N}$ then:

$$V_{1-N} = V_{A-N} \frac{(N2+N3)}{(N1+N2+N3)}$$

It is shown in ISBN 0-7803-1137-X that certain desirable turns and turns ratios exist in the basic wye connection to obtain nearly equal amplitude output voltage vectors shifted by 40°. These basic ratios affect turns N1 through N5 and are maintained in this invention. However, the addition of turns N6 and N7 and the tappings produced at points such as P1, P2, P3 allow the unique results of this invention to be obtained. Some practical examples defining turns N1 through N7 are given in table 1. Excellent results are achieved with these practical integer numbers. Small amplitude and phase angle deviations from the ideal are noted in the table. These deviations do not detract from the practical usefulness of the design and it will be apparent to those of ordinary skill in the art that other turns selections are feasible.

If the transformer voltage vectors are assumed to be represented by the coils shown in FIG. 3 then the amplitude and phase of output voltages can be determined. For example, let the voltage $V_{A-N}$ be used as the reference vector and defined as $1\angle 0°$, then the output voltage $V_{1-N}$ is given by $V_{1-N}=1\angle 0°$ (N2+N3)/(N1+N2+N3). The output voltage $V_{2-N}$ is given by $V_{2-N}=1\angle 0° + 1\angle -120°$ (N5/(N1+N2+N3)). Other voltages are caculated using the vector algebra in a similar fashion. Because the turns are all integer values it is readily possible to select the sum of turns (N1+N2) to equal turns N4, N5, N6, and N7. As an example, consider the turns in the first row of table 1, then:

$V_{1-N}=0.8792\angle 0°$, and $V_{2-N}=1\angle 0°+0.651\angle -120°$ i.e. $0.8791\angle -39.89°$.

TABLE 1

Possible Turns for Auto-transformer and Resulting Characteristics

| N1 turns | N2 turns | N3 turns | N4 turns | N5 turns | N6 turns | N7 turns | Amplitude deviation from ideal. | Phase angle deviation from 40°. |
|---|---|---|---|---|---|---|---|---|
| 18 | 79 | 52 | 97 | 97 | 97 | 97 | −0.012% | −0.109° |
| 11 | 49 | 31 | 60 | 60 | 60 | 60 | 0.16% | 0.425° |
| 6 | 27 | 17 | 33 | 33 | 33 | 33 | 0.07% | 0.46° |
| 5 | 23 | 15 | 28 | 28 | 28 | 28 | −0.5% | −0.01° |
| 4 | 18 | 11 | 22 | 22 | 22 | 22 | 0.35% | 0.893° |
| 3 | 13 | 9 | 16 | 16 | 16 | 16 | −0.3% | −0.8° |
| 2 | 9 | 6 | 11 | 11 | 11 | 11 | −0.446% | −0.363° |

Voltages across the various coils and the currents flowing through them will vary very slightly depending upon the exact choice of turns ratios. However, practical calculations to obtain the transformer rating are made using formulas derived in ISBN 0-7803-1137-X wherein the winding voltages are defined. If the amplitude of the nine output AC voltages is $V_{OUT}$ and the DC output voltage from a 9-phase rectifier load as the processing device is $V_{DO}$ then:

$V_{DO}=2.77 V_{OUT}$ or written alternatively, $V_{OUT}=0.361 V_{DO}$

By inspection, the voltage across (N2+N3) turns is $V_{OUT}$, i.e. $0.361 V_{DO}$ and this relationship enables all the coil voltages to be defined in terms of the DC output voltage. For example, using data in the top row of table 1 we get (N2+N3) is 131 turns, thus the voltage across the 97 turns used in the N4, N5, N6, and N7 coils is $(97/131) \times 0.361 V_{DO}$, namely, $0.267 V_{DO}$. Voltages across other coils are determined in a similar manner.

Calculation of the winding currents in terms of the total DC load current $I_{DC}$ is not straightforward due to the complex time-varying current functions and the precise nature of the load current. An approximate worst-case result is obtained by assuming that the load current is smooth, an assumption that is made in the analysis of many rectifier circuits. In conjunction with a computer simulation the following approximate results shown in table 2 are obtained:

TABLE 2

Typical Coil RMS Current Relative to $I_{DC}$

| N1 | N2 | N3 | N4 | N5 | N6 | N7 |
|---|---|---|---|---|---|---|
| 0.534 | 0.24 | 0.23 | 0.26 | 0.26 | 0.22 | 0.22 |

To calculate the equivalent transformer kVA power rating relative to the output DC power the total volt-ampere product for each of the coils is summed. When this is carried out the result obtained is:

$$\frac{\text{Transformer kVA}}{\text{DC load kW}} \approx 0.55$$

The above kVA rating constitutes a very favorable ratio and results in a transformer rating which is less than half that required in a practical double-wound transformer to achieve the same 18-pulse converter results.

What I claim is:

1. An auto-transformer for converting 3-phase AC power to 9-phase AC power, comprising:
   a. three phases each having a plurality of serial and stub windings;
   b. said serial windings forming a wye connection;
   c. said stub windings each being magnetically coupled with corresponding ones of said serial windings;
   d. said serial windings being connected at one end to the corresponding point of said serial windings of the other two phases to form an electrical neutral point;
   e. three terminals connected to respective ends of said serial windings furthermost from the neutral point for connecting to a source of (three-phase) 3-phase AC power;
   f. the end of said serial windings furthermost from the neutral point being connected to one end of a first set of two stub windings comprising windings from the other two phases;
   g. the junction of said serial windings closest to the neutral point being connected to one end of a second set of two stub windings comprising windings from the other two phases;
   h. a first opposite end of said first set of stub windings being connected to a first opposite end of said second set of stub windings to form a first output terminal;
   i. a second opposite end of said first set of stub windings being connected to a second opposite end of said second set of stub windings to form a second output terminal;
   j. the combination of a portion of said serial windings and said stub windings forming two delta connections on each phase;
   k. said delta circuits comprising equal numbers of turns in each side of the delta;

l. the junction of said serial windings furthermost from the neutral point providing a third output terminal;

m. three said output terminals from each phase to make a total of nine output terminals.

2. The auto-transformer of claim 1 wherein the nine output voltages are generally equal in amplitude and separated from each other by 40° taken in sequence.

3. The auto-transformer of claim 1 with an additional tapping on said serial windings such that the source of AC power may be connected to said tapping so as to cause an increase in the amplitude of the nine output voltages.

4. The auto-transformer of claim 1 with an additional series connected winding on each phase with said additional winding being magnetically coupled with serial windings on that phase such that the source of AC power for each phase may be connected to the end of said additional winding so as to reduce the amplitude of the nine output voltages.

* * * * *